Sept. 4, 1951 R. H. HOLLAND ET AL 2,566,523
SUN VISOR
Filed Nov. 12, 1947 2 Sheets-Sheet 1

T. W. STEPHENSON
R. H. HOLLAND
INVENTOR.

ATTORNEYS

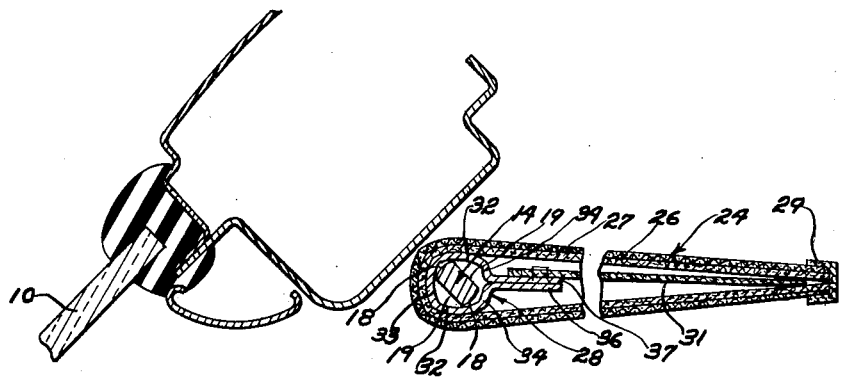
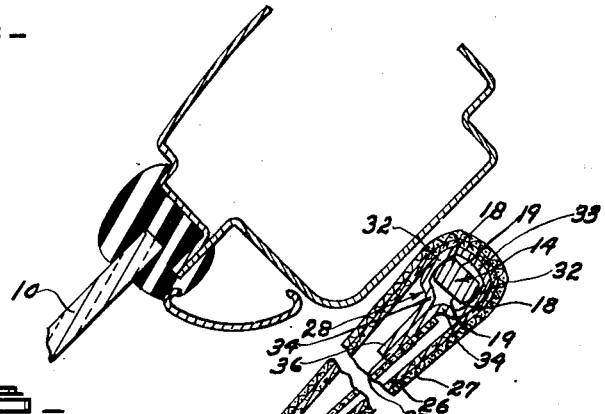
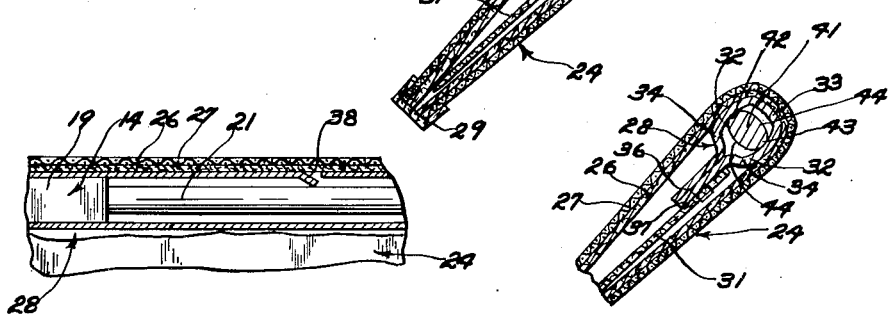

Patented Sept. 4, 1951

2,566,523

UNITED STATES PATENT OFFICE 2,566,523

SUN VISOR

Robert H. Holland and Thomas W. Stephenson, Detroit, Mich., assignors to Ford Motor Company, Dearborn, Mich., a corporation of Delaware Application November 12, 1947, Serial No. 785,446

1 Claim. (Cl. 296—97)

The sun visors used in the modern automobile are generally swingably mounted in a horizontal plane so that the visor may be swung from a position adjacent the windshield to a position adjacent the side window. Vertical adjustment of the visor unit is obtained by frictionally mounting the visor on the supporting arm, enabling the operator to swingably adjust the visor from the unused position adjacent the roof to a usable position adjacent the windshield. The main disadvantage of such a visor is that no adjustment means are provided for extending the visor to cover the central portion of the windshield, the visor therefore being ineffective when the sun is in such a position that its rays are entering the central section of the windshield.

Another type of visor now in common use is slidably mounted on the supporting member and permits lateral adjustment of the visor to shield the central portion of the windshield. Such a visor does not incorporate frictional means for locking the visor, but uses a set screw, wing bolt or the like to lock the visor into position. This manual operation of the set screw, or the like, creates a driving hazard each time the visor is adjusted; also, the production cost of such a unit is appreciably increased due to the use of more parts and their assembly.

The instant invention, while incorporating the advantages of the present-day visors, eliminates the disadvantages thereof in that while the visor is capable of swingable movements from a position adjacent the windshield to a position adjacent the side window and from a position adjacent the roof to a position adjacent the windshield, it is also axially slidably mounted on the supporting member to enable the operator to adjust the visor in a lateral manner to cover the central portion of the windshield. The visor is then locked in the desired position, without employing locking screws, or wing bolts, but by using a supporting member having an out-of-round cross section which provides frictional locking means, and yet in which the visor may be slidably operated on the supporting member.

Other objects and advantages of the invention will be more apparent as the description proceeds, especially when considered in connection with the accompanying drawings, in which:

Figure 4 is a cross sectional view similar to Figure 3, with the sun visor in an unlocked, or slidable position.

Figure 5 is a cross sectional view similar to Figure 3 showing the sun visor in the locked, normal use position.

Figure 6 is an enlarged fragmentary cross sectional view of the sun visor shown in Figure 1, showing the catch or limit stop.

Figure 7 is a fragmentary cross section of a sun visor showing an alternate supporting member structure.

Figure 1:
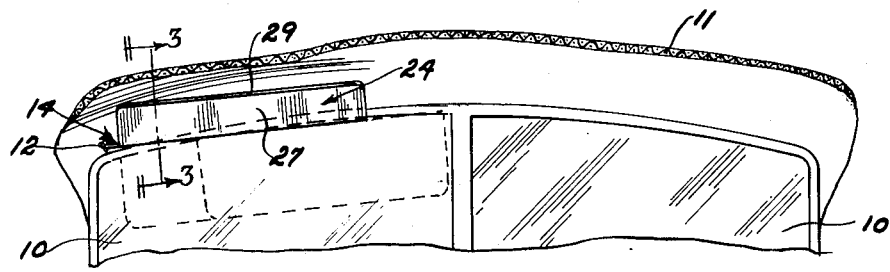
Figure 1 is an inside elevational view of a portion of an automobile as viewed when looking forwardly from the front seat, having a sun visor incorporating the present invention mounted thereon.

Referring now more particularly to the drawings, the reference character 10 designates the windshield of an automobile, having a roof section 11 to which is attached in a conventional manner a mounting bracket 12, the latter having a bore 13 into which the supporting member 14 is mounted.

The end portion 16 of the supporting arm 14 is circular in cross section and is bent upwardly at approximately 90° to the remainder of the supporting arm 14. Said end portion 16 is swingably mounted in the bore 13 of the mounting bracket 12 and is held in place in a conventional manner by placing a compressed spring 17 over the end portion 16 and flaring the ends of such end portion 16 to hold the spring. It will be noted that a small radius attaches the end portion 16 to the remainder of the supporting member 14, and that the upward thrust of the spring 17 holds the small radius against the lower edge of the bore 13, creating a friction lock which holds the supporting arm 14 in any position to which it may be swung.

Figure 2:
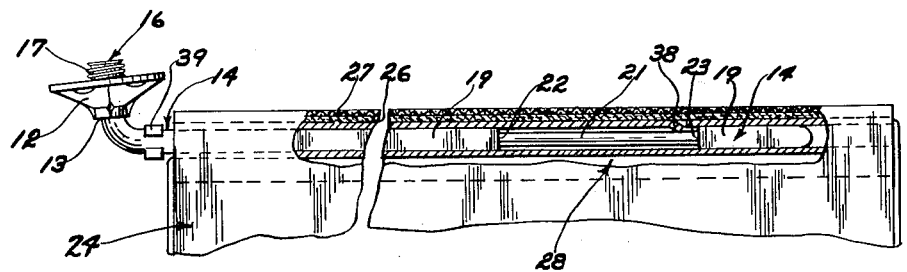
Figure 2 is a partially cut away sectional view of the sun visor shown in Figure 1.
Figure 3:
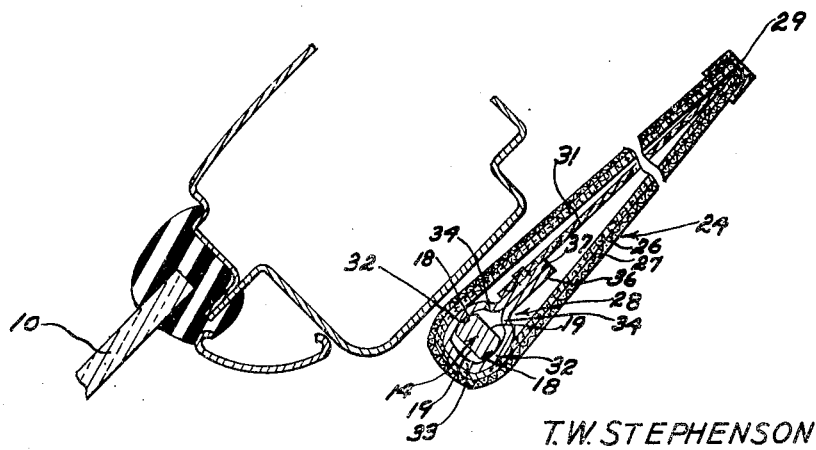
Figure 3 is a cross sectional view taken on the line 3—3 of Figure 1.

As seen in Figure 3, the supporting member 14 is out-of-round in cross section, having two diametrically opposed arcuate surfaces 18 and two flat surfaces 19 intermediate the opposed arcuate surfaces 18. A small reduced portion 21, intermediate the ends of the supporting member 14, is turned to a diameter smaller than the distance between the opposed flat surfaces 19, as best shown in Figure 2, the shoulders 22 and 23 being formed as the result of such machining.

The supporting member 14 supports a visor unit 24 which is constructed of a stiff cardboard 26, covered by a suitable fabric 27, and which is bent around a hinge member 28 and tapered to a predetermined point where the two sides of the stiff cardboard 26 are securely fastened together by a gimp binding 29. A cardboard stiffening member 31 extends downwardly from the hinge member 28 and is secured into the angle formed when the two sides 26 of the visor are fastened together.

Referring again to Figure 3, it will be seen that the hinge member 28 is formed of sheet steel and is out-of-round in cross section, having two diametrically opposed arcuate sides 32, an arcuate outer side 33, and base portions 34 bent to form adjacent flanges 36 and 37. Said flanges 36 and 37 extend downwardly in the visor unit and are fastened securely to the stiffening member 31 by staples, or other conventional means, to keep the hinge member from turning when the visor unit is turned on the supporting member.

An out-of-round socket is formed in the hinge member by the opposed arcuate sides 32, the outer side 33, and the base portions 34, into which the supporting member 14 is fitted. Said supporting member 14 is then forced past the catch 38 which is punched downwardly in the top of the hinge member 28 as shown in Figures 2 and 6. Said catch is sufficiently elastic to spring back into the reduced portion 21. When the visor unit 24 is operated laterally along the supporting arm 14, the shoulder 23 engages the catch 38 and acts as a stop, thus limiting the lateral movement of the visor unit.

The distance between the two opposed arcuate sides 32 of the hinge member is slightly less than the distance between the two opposed arcuate surfaces 18 of the supporting member. Thus, when the visor unit 24 is in the up or unused position, the opposed arcuate surfaces 32 of the hinge member are in tight frictional contact with the opposed arcuate surfaces 18 of the supporting member resulting in a friction lock that securely holds the visor in a position against the roof 11 of the automobile as shown in Figure 3.

When the visor is in the usable or down position as shown in Figure 5, it will be seen that the visor has been swung downwardly approximately 180° and in this position it is also frictionally locked, since the surfaces 18 of the supporting arm and the sides 32 of the hinge member are again in frictional contact.

When the visor is in a position approximately 90° from either the up or down position, as shown in Figure 4, it will be noted that the arcuate surfaces 18 of the supporting member are no longer in contact with the arcuate surfaces 32 of the hinge member, nor are they in frictional contact with the outer side 33 and the base portions 34 of the hinge member. The distance between the outer side 33 and the base portions 34 is greater than any dimension of the supporting arm, allowing a sliding fit when the visor is in this position.

It will be noted that an angular locking range is provided by this construction. As long as any portion of the arcuate surfaces 18 of the supporting member are in contact with the arcuate surfaces 32 of the hinge member, there will be frictional contact and a resulting frictional lock. It will be noted that an angular range of movement is also provided in the unlocked position when the arcuate surfaces 18 of the supporting member are not in contact with the arcuate surfaces 32 of the hinge member. Such angular ranges of movement give the operator a choice of positions in which the visor may be locked as well as a range of movement in which the visor is unlocked.

In the position as described above and shown in Figure 4, the visor unit is slidable along the length of the supporting member 14, such movement being limited inwardly by the stops 39 struck out from the supporting arm and outwardly by the catch 38 as it comes in contact with the shoulder 23 of the supporting arm.

The amount of travel provided between the stops is sufficient to cover the central portion of the windshield and the visor may be set at any desired point along this distance by merely pulling the visor down from the unlocked position to the locked position where the friction lock will hold it.

Many modifications in the construction of the hinge member and supporting member are possible. One such modification of the supporting member is shown in Figure 6 where a cross section of the supporting arm 41 is elliptical in form with two opposed arcuate surfaces 42 and 43 having a larger diameter than the distance between opposed arcuate surfaces 32 of the hinge member. The surfaces 44 of the supporting member 41 have a smaller diameter than any diameter of the hinge member. It will therefore be seen that the visor will be locked and unlocked in the same positions as described above.

The structure as shown and described permits easy manipulation of the visor unit to any desired position either laterally or vertically, and a means for locking said visor unit in that position by friction means is provided.

It will be understood that the invention is not to be limited to the exact construction shown and described, but that various changes and modifications may be made without departing from the spirit and scope of the invention as defined in the appended claim.

What is claimed is:

A sun visor assembly adapted to be mounted upon an automobile body comprising, an elongated supporting member having a portion out-of-round in cross section, said out-of-round portion having two opposed arcuate sides and two opposed sides intermediate said arcuate sides, and a visor unit having a socket formed therein, said socket being out-of-round in cross section and having two opposed arcuate sides, the distance between said socket arcuate sides being slightly less than the distance between the opposed arcuate sides of said supporting member to frictionally hold said visor unit in selected positions on said supporting member, said socket also having an arcuate outer side and a base portion opposite said arcuate outer side, the distance between said arcuate outer side and said base portion being greater than the distance between the opposed arcuate sides of said supporting member to permit slidable adjustment on said supporting member.

ROBERT H. HOLLAND.
THOMAS W. STEPHENSON.

REFERENCES CITED

The following references are of record in the file of this patent:

UNITED STATES PATENTS

| Number | Name | Date |
| --- | --- | --- |
| 2,201,377 | Schoenheit | May 21, 1940 |
| 2,201,378 | Schoenheit | May 21, 1940 |
| 2,294,317 | Pelcher et al. | Aug. 25, 1942 |
| 2,360,183 | Westrope | Oct. 10, 1944 |
| 2,458,677 | Brundage | Jan. 11, 1949 |